April 16, 1968  G. DE COYE DE CASTELET  3,377,846

METHOD OF AND MEANS FOR BALANCING ROTARY ENGINES

Filed March 29, 1965

Inventor
Gaetan De Coye De Castelet
By Stevens, Davis, Miller & Mosher
Attorneys

United States Patent Office 3,377,846
Patented Apr. 16, 1968

3,377,846
METHOD OF AND MEANS FOR BALANCING ROTARY ENGINES
Gaëtan de Coye de Castelet, Billancourt, France, assignor to Regie Nationale Des Usines Renault, Billancourt, France
Filed Mar. 29, 1965, Ser. No. 443,204
Claims priority, application France, Apr. 2, 1964, 969,521, Patent 1,398,896
2 Claims. (Cl. 73—66)

ABSTRACT OF THE DISCLOSURE

A method and means for balancing the assembly of an eccentric engine shaft, rotor, and counterweights for a rotary internal combustion engine comprising first balancing the shaft and counterweights with a standard rotor mounted on the shaft, then replacing the standard rotor with a production rotor and compensating for any weight differential by mounting weights in the eccentric portion of the shaft.

---

This invention relates to rotary engines of the type having a rotor rotating on an eccentric inside a stationary casing. In such engines, if the rotor is balanced about its own rotation axis, then, because of its eccentric motion with respect to the engine axis, it creates an inertial force of constant magnitude proportional to its mass. This mass can be balanced in known manner by two counterweights rotating with the engine shaft and positioned on either side or the same side of the rotor.

Such balancing is achieved on a balancing machine, using the drive shaft on which are mounted the two counterweights and either the rotor itself or a mass equivalent thereto (which is more convenient when the weight of the cooling fluid must also be taken into account).

This balancing operation must be carried out for each individual rotation assembly since the weight of the rotor will usually differ due to the fact that it is a casting.

For greater simplification, the balancing of individual assemblies can be effected by using a standard mass and by equalizing the weights of all the rotors in the course of manufacture. This requires that the rotors have a mass that can be reduced as necessary, which is often impossible because it is imperative not to drill holes in the peripheral surface or the sides in order not to break the continuity of these surfaces (against which the sealing elements rub). And even if the shape of the rotor should permit the provisions of easily accessible masses without the need to modify said surfaces in any way, the machining operation necessary on such masses is nonetheless very costly.

The present invention relates to a method of balancing engines on a quantity basis which circumvents the disadvantages referred to and which has the added advantage of enabling the replacement of a rotor in an engine without the need to mount the engine shaft on the balancing machine anew.

Essentially, this method consists in compensating inequalities in the rotor mass by means of weights placed in the eccentric on which the rotor rotates. Because such weights can be positioned at a distance from the rotation axis greater than the radius of eccentricity and consequently farther from said rotation axis than the masses to be balanced, they can be much smaller than the latter and therefore do not significantly increase the weight of the rotating parts.

In view of this, the balancing can be done on a quantity basis by proceeding in the manner described hereinbelow.

Each engine shaft balanced in known manner has mounted thereon the two counterweights and a standard rotor whose weight corresponds to the maximum weight permissible for that component, plus possibly the weight of the cooling fluid.

Each rotor is weighed after it has been machined, thereby determining its difference in weight with respect to the standard rotor.

This difference in weight can then be compensated by placing a determinate additional mass inside previously prepared bores in the eccentric.

The invention will now be more particularly described with reference to the accompanying non-limitative exemplary drawing, in which.

Figure 1:
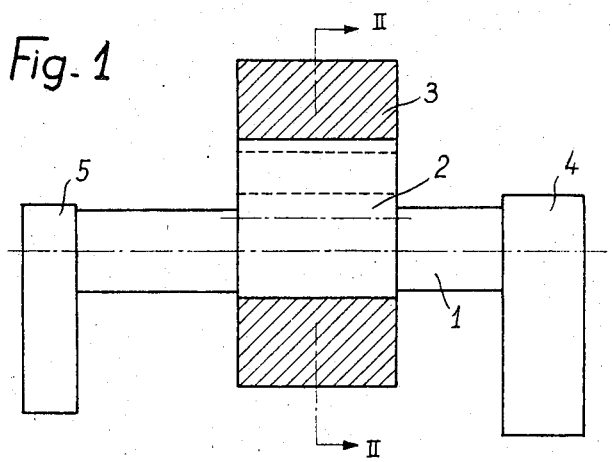
FIGURE 1 is a schematic longitudinal view of a rotary engine shaft with its rotor.
Figure 2:
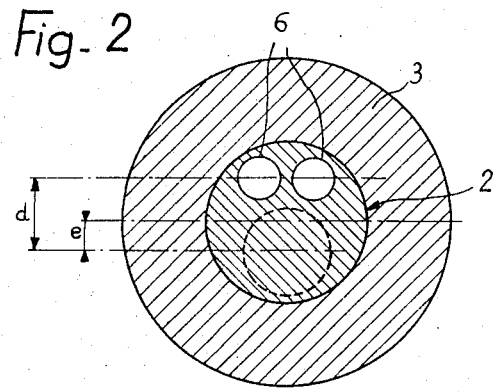
FIGURE 2 is a section taken through the line II—II of FIGURE 1.

Referring first to FIGURE 1, there is shown therein an engine shaft 1 with its eccentric 2 on which is mounted a rotor 3. The engine shaft carries balancing counterweights 4 and 5 on its two ends.

After the assembly has been balanced by means of a standard rotor of weight $p_1$ (not shown), the rotor 3 is weighed, this weight being represented by $p_2$.

In accordance with the present invention, the weight difference $p_1 - p_2$ is compensated by one or more additional masses of total weight $(p_1 - p_2) \times e/d$ positioned at a distance $d$ from the engine shaft axis, $e$ being the radius of eccentricity.

For carrying the subject method of this invention into practice, each eccentric has holes 6 previously formed therethrough which are bored out parallel to the shaft axis and located symmetrically with respect to the line joining the centers of the engine shaft and the rotor. After the rotor has been weighed, all that is necessary is to insert suitable additional masses into said holes, a full range of such masses being preferably prepared beforehand.

Figure 3:
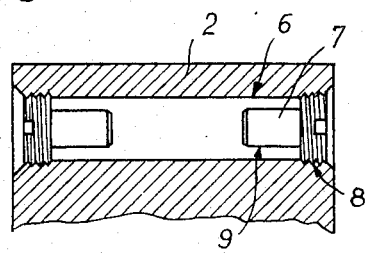
FIGURE 3 is a radial section of the eccentric, showing an exemplary method of providing the balancing masses.

The masses can be provided in a variety of different ways, and more particularly in the manner shown by way of example in FIGURE 3. In this example, the hole or holes 6 drilled through the eccentric have screw-threads formed in their two extremities. The additional masses 7 comprise a matching threaded portion 8 of constant length, which is extended by a smooth cylindrical portion 9 the length of which depends on the weight of the mass. After being positioned the masses are lightly peened to prevent them from unscrewing.

In cases where the rotor is out of balance with respect to its transverse centerplane II/II, the necessary compensation can be provided by placing different masses at each end of the holes drilled through the eccentric.

What is claimed is:
1. A method of balancing rotary internal combustion engines, and more specifically an assembly for such engines comprising an eccentric engine shaft having a rotor and counterweights mounted thereon, to compensate for possible differences in weight of production rotors, comprising the steps of initially balancing said assembly including a standard rotor having the maximum permissible weight, providing cavities in each eccentric parallel to the engine axis and positioned symmetrically with respect to a line joining the centers of the engine shaft and the rotor, replacing said standard rotor with a production rotor and placing in said cavities a total additional mass sufficient to compensate for the difference between the weights of said production rotor mounted on the shaft and the maximum permissible weight of said standard rotor.

2. A means to balance an assembly of an eccentric engine shaft having a rotor and counterweights mounted thereon, said assembly being used in a rotary internal combustion engine, comprising a standard rotor of maximum permissible weight, means to balance the counterweights on said shaft with said standard rotor thereon, cavity means in said eccentric disposed parallel to the shaft axis and symmetric with respect to a line joining the centers of said shaft and said rotor, a production rotor mounted on said shaft in place of said standard rotor, and compensating weight means fixedly mounted in said cavity means to compensate for any weight differential between said standard and said production rotors.

References Cited

UNITED STATES PATENTS

| | | | |
|---|---|---|---|
| 531,487 | 12/1894 | Vauclain | 73—482 |
| 1,367,478 | 2/1921 | Hapgood | 73—487 |
| 1,458,475 | 1/1923 | Freed | 73—65 |
| 1,949,478 | 3/1934 | Kindelmann et al. | 74—573 |
| 2,964,972 | 12/1960 | Lindsey et al. | 74—573 |

FOREIGN PATENTS 631,520  11/1949  Great Britain.

JAMES J. GILL, *Primary Examiner.*